Figure 1:
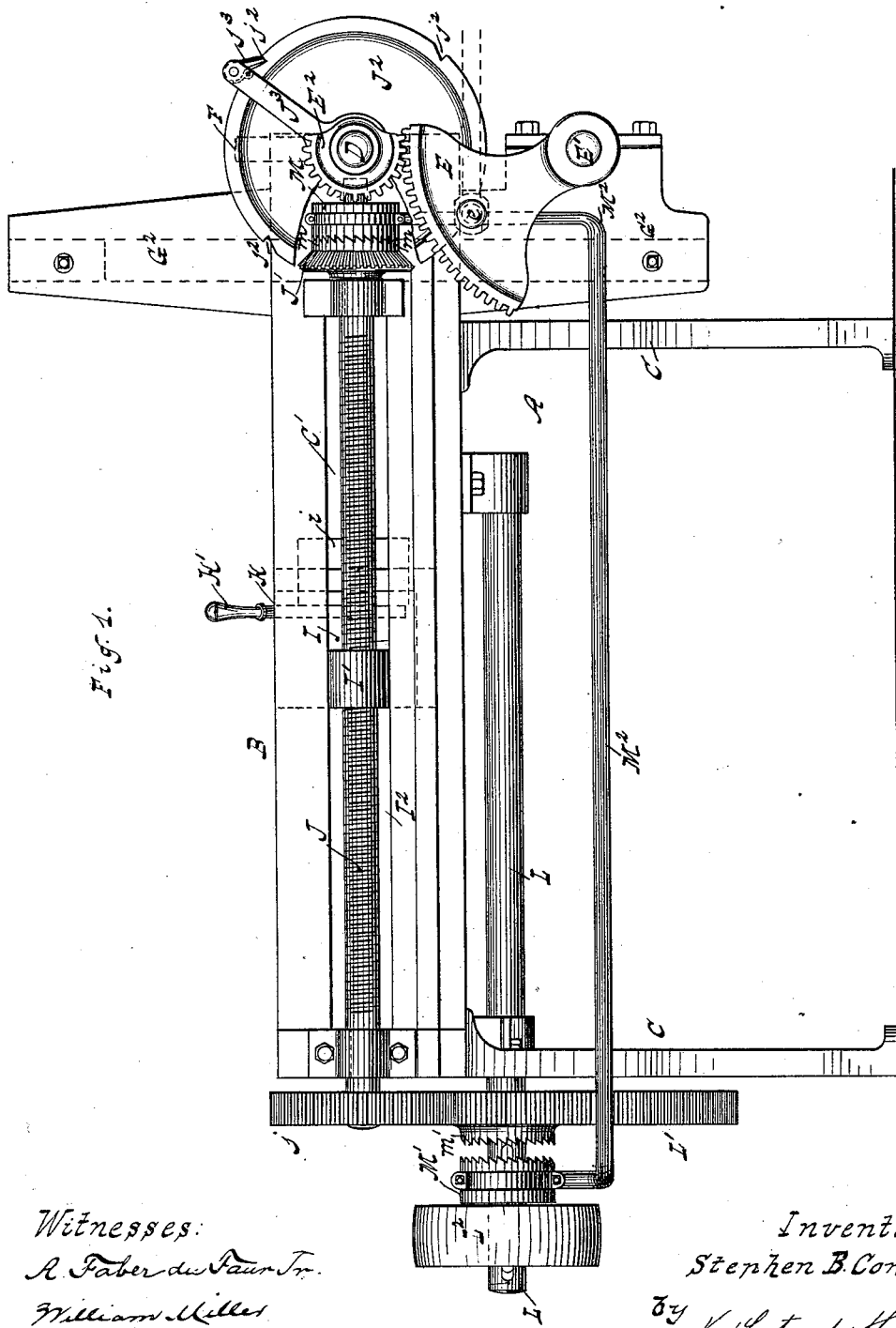

(No Model.)  3 Sheets—Sheet 1.

S. B. CONOVER.
MACHINE FOR CUTTING OVAL SHELL DISHES.

No. 335,431. Patented Feb. 2, 1886.

Witnesses:
R. Faber du Faur Jr.
William Miller

Inventor:
Stephen B. Conover
By Van Santvoord & Hauff
his Attorneys.

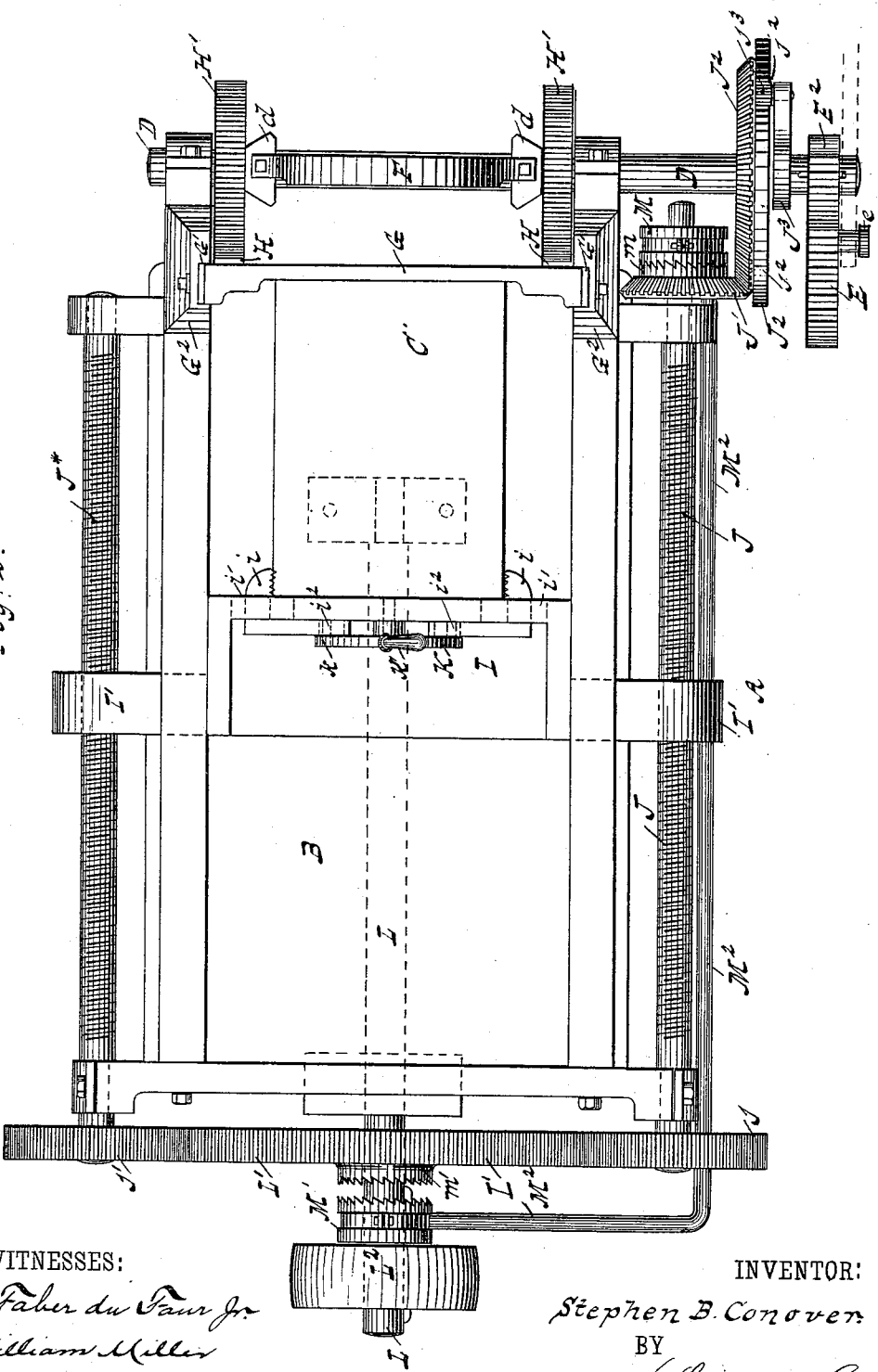

(No Model.) 3 Sheets—Sheet 3.
S. B. CONOVER.
MACHINE FOR CUTTING OVAL SHELL DISHES.
No. 335,431. Patented Feb. 2, 1886.
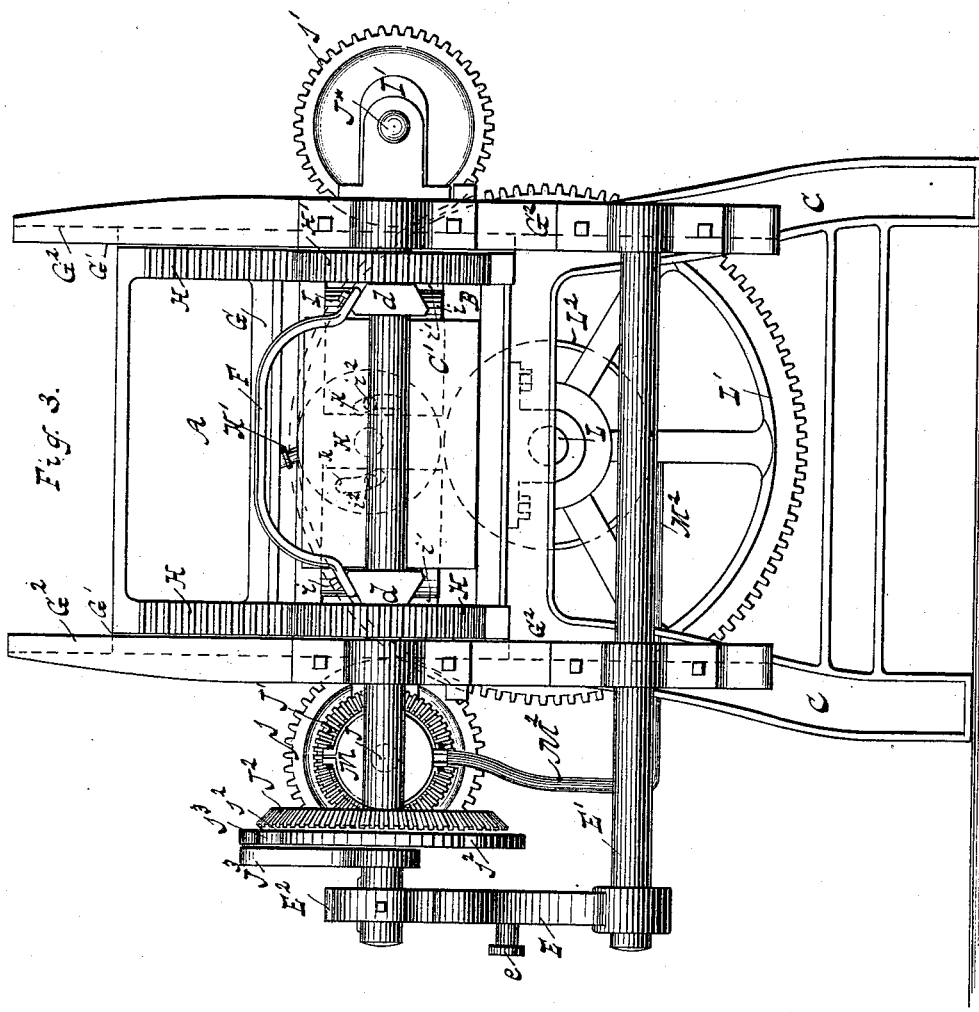
WITNESSES:
INVENTOR
Stephen B. Conover.
BY
his ATTORNEYS

UNITED STATES PATENT OFFICE.

STEPHEN B. CONOVER, OF NEW YORK, N. Y., ASSIGNOR TO HIMSELF AND LORANA BEDELL, OF SAME PLACE.

MACHINE FOR CUTTING OVAL-SHELL DISHES.

SPECIFICATION forming part of Letters Patent No. 335,431, dated February 2, 1886.

Application filed June 11, 1885. Serial No. 168,368. (No model.)

*To all whom it may concern:*

Be it known that I, STEPHEN B. CONOVER, a citizen of the United States, residing at New York, in the county and State of New York, have invented new and useful Improvements in Machines for Cutting Oval-Shell Dishes, of which the following is a specification.

My invention relates to improvements in machines for cutting continuously from a block of wood, concavo-convex shells or plates; and it consists, essentially, in the combination, in such a machine, of a vibrating curved knife and a reciprocating facing-knife, and also in the combination of a curved knife attached to a rocking knife-shaft, a facing-knife reciprocating in vertical guideways and cutting in advance of the curved knife, and mechanism, as will be hereinafter described, for intermittently feeding the block to the said knives after both the latter have cleared the block in their return motion, all of which, together with other novel features, are more fully pointed out in the following specification and claims, and illustrated in the accompanying drawings, in which—

Figure 1 represents a side elevation of my improved machine. Fig. 2 is a plan or top view of the same. Fig. 3 is a front elevation thereof.

Similar letters indicate corresponding parts.

In the drawings, the letter A designates the frame of my improved machine, which consists, essentially, of a trough, B, supported upon suitable legs or standards, C, and which is designed for the reception of the block C', from which the shells are cut. At the front end of the trough bearings are provided for the transverse shaft D, to which a rocking motion is imparted by any suitable means. In the example shown in the drawings, the aforesaid motion is imparted to the said shaft, which hereinafter I shall designate the "knife-shaft," by a toothed segment, E, fixed on a transverse shaft, E', having suitable bearings in the front end of the frame, and this segment engages a gear or gear-segment firmly mounted on the knife-shaft D. A vibrating motion is imparted to the segment E by a connecting-rod, (shown by dotted lines in the drawings,) which is connected with the pin $e$ on the segment. However, any other well-known mechanism may be substituted for the rod and pin.

The knife-shaft D is provided in front of the trough with a pair of collars, $d\,d$, to which are firmly secured the ends of a curved knife, F, which vibrates with its shaft.

In order to face the block (which is necessary, so that the shells cut may all be of one size) during the operation of cutting the shells, I employ a transverse facing-knife, G, which reciprocates in vertical guideways G', formed in the standards G², which are either cast with the trough or secured thereto in the ordinary manner.

On the knife are racks H H, which are adapted to be engaged by gear-wheels H' H', mounted on the knife-shaft, and the position of the knife is such that it just clears the front end of the bottom of the trough B when the shaft is vibrated.

To compensate for wear, I provide the guideways with gibs, adjustable by screws, as usual.

The block C' is secured at one end to a follower, I, which slides longitudinally in the trough, and is provided with extensions I' I', which extend through and work in suitable guideways, I² I², formed in the trough, and have therein internal screw-threads, which are engaged by feed-screws J J*, extending parallel with the trough, and having suitable bearings on the sides of the latter. If desired, the extensions may be provided with split nuts, so that the follower can be thrown clear of the feed-screws.

The block C', in the example shown in the drawings, is secured to the follower by means of dogs $i\,i$, which extend through slots $i'\,i'$ in the front wall of the follower, their outer ends being provided with teeth, which grasp the block, while their inner ends are provided with pins $i^2\,i^2$, which are engaged by eccentric slots $k\,k$, formed in a disk, K, which is pivoted to the follower, and can be oscillated upon its pivot by the upwardly-projecting arm K', so that when the arm K' of the disk is moved in the proper direction the dogs are moved together, so as to securely clamp the block to be cut.

Instead of using this mechanism for firmly clamping the block, other ordinary means—such as the common chuck mechanism—may be employed to fulfill the functions of the mechanism shown.

It will be seen from the drawings that the curved knife F and the facing-knife are both set in motion at the same time, but that the facing-knife has a certain amount of lead or advance—that is to say, it strikes the block before the said curved knife; and it is evident that this amount of lead or advance must necessarily be such that the facing-knife will not interfere with the cutting of the curved knife. The angular movement or throw of the curved knife need only be sufficient to completely cut the shell from the block, and from the relative position of the knives, just defined, it is clear that on the return movement of the knives the facing-knife will be the last to clear or leave the block, the motion of both being continued until the curved knife reaches about the vertical position shown in the drawings.

During the interval extending from the moment that the facing-knife leaves the block to the position of rest the block is fed forward as follows: Each of the two feed-screws J J* is provided on one end with a fast gear-wheel, $jj'$, which mesh into a common gear-wheel, L', mounted loosely on a shaft, L, having bearings on the bottom of the trough. On one of these feed-screws J J* is mounted a loose bevel-gear, J', which is engaged by a bevel-gear, J², mounted loosely on the knife-shaft D, the latter being provided with a turned portion having thereon, in the example shown in the drawings, four recesses, $j^2$, which are adapted to be engaged by a spring-pawl, $j^3$, carried by an arm, J³, secured to and projecting from the knife-shaft. However, the recesses could be formed directly in the back of the gear-wheel, and a spring-pressed post extending from the side of the arm could be used for the same purpose. The recesses in the bevel-gear are so inclined that the pawl $j^3$ rotates the loose gear-wheel J² only in its movement in the direction of the arrow shown thereon. This motion is communicated to the loose gear J', into which it meshes, which gear is provided with a clutch, m, which is continuously engaged during the forward feed of the block by the sliding clutch-collar M, which is connected to a similar sliding collar, M', on the shaft L, by a rod, M², the said collar M' being constantly out of engagement during the forward feed, with a clutch, m', formed on the loose gear-wheel I'. The four recesses $j^2$ on the bevel-gear J², as shown in the drawings, are at equal distances from each other, and so distributed on its periphery that the spring-pawl does not engage any of them until after the facing-knife has left the block in its return motion, whence it will engage with one of the said recesses and turn the gear into the position shown in the drawings, thus completing one revolution of the bevel-gear J² in four vibrations of the knives. The intermittent rotary motion of the gear is transmitted to one of the feed-screws, as previously described, from which it is transmitted to the other through the medium of the gears $jj'$ on the said feed-screws, and the loose gear L' on the shaft L, and the follower, together with the block secured thereto, is intermittently fed forward to the knives.

In order that the follower may be automatically withdrawn when desired, I mount a tight pulley, L², on the shaft L*, to which a continuous rotary motion is given by any suitable means, so that when the clutch-collar M' (which is prevented from rotating by a feather-key) is thrown into engagement with the clutch m on the loose gear I', which consequently throws the clutch-collar M out of engagement with the loose gear J² on the feed-screw J, said loose gear becomes fixed on the shaft and the feed-screws are rotated in a direction opposite to their former motion, and the follower will be withdrawn; and the motion is arrested by throwing the clutch out of engagement, which can be done either automatically or by hand.

I am aware of Letters Patent No. 276,198, of 1883, in which is described and claimed a machine for cutting concavo-convex shells continuously from a block of wood, the same comprising in its construction a revolving curved knife having both its ends attached to a driving-shaft and a facing-knife attached radially to a shaft located at an angle to the driving-shaft. In the machine for accomplishing the same purpose, hereinbefore described, I do not employ a revolving knife, neither do I make use of a facing-knife attached radially to a shaft, such as described in the said Letters Patent; but I make use of a reciprocating vibrating knife, which cuts the shells, and a facing-knife which reciprocates in vertical bearings. In the said Letters Patent mechanism is described for feeding a block intermittently to the said knives after the throw of the cutting-knife and before the throw of the facing-knife, while in my machine I feed the block, by the mechanism hereinbefore described, before the throw of both knives—that is to say, during the return motion of the said knives and after the same have cleared the block, both knives cutting at the same time, while in the said Letters Patent the knives alternately operate upon the block.

I am also aware of Letters Patent No. 315,509, in which an oscillating or revolving curved knife and an oscillating or revolving facing-knife are so arranged that the path of one is intersected by the path of the other, and the facing-knife follows the curved knife in the cutting operation. Such, therefore, I do not claim.

What I claim as new, and desire to secure by Letters Patent, is—

1. In a machine for cutting wooden shells from a block of wood, the combination of the frame A, the vertical guides G', rigidly connected with the opposite sides of the frame, the facing-knife G, reciprocating in a right line on said vertical guides, the rocking shaft D, journaled on the frame, and a curved knife, F, rigidly connected with the shaft, said knives simultaneously cutting the block, but the facing-knife leading the curved knife in cutting the block and following the curved knife in leaving the block, substantially as described.

2. In a machine for cutting wooden shells from a block of wood, the combination of the frame A, the vertical guides G', rigidly connected with the opposite sides of the frame, the facing-knife G, having a rack and reciprocating in a right line on said guides, the rocking knife-shaft having a gear engaging said rack, and a curved knife, F, rigidly secured to the knife-shaft, substantially as described.

3. The combination, with a suitable frame, the vibrating curved knife, the facing-knife, and the follower, of the feed-screws journaled to the frame and suitably geared together, a bevel-gear mounted loosely on the knife-shaft, which engages a bevel-gear on one of the feed-screws, the arms on the knife-shaft, and the pawl thereof constructed to intermittently engage the bevel-wheel on the knife-shaft, substantially as shown and described.

4. The combination, with the knife-shaft, the feed-screws, and the rotary shaft, of the loose gear on the said shaft, which meshes into gear on the feed-screws, the clutch thereof, the bevel-gear on one of the feed-screws, the clutch thereof, and the connected clutch-collars on the shaft and feed-screws, substantially as shown and described.

5. The combination of the vibrating curved knife secured to the knife-shaft, the facing-knife, the rack thereof, the gears on the knife-shaft which engage the rack on the facing-knife, the gear on the knife-shaft, and the vibrating segment which engages the gear on the knife-shaft and imparts a reciprocating rocking motion to the same, substantially as shown and described.

In testimony whereof I have hereunto set my hand and seal in the presence of two subscribing witnesses.

STEPHEN B. CONOVER. [L. S.]

Witnesses:
W. HAUFF,
A. FABER DU FAUR, Jr.